(12) United States Patent
Kompalli et al.

(10) Patent No.: US 11,492,529 B2
(45) Date of Patent: Nov. 8, 2022

(54) ENERGY EFFICIENT CEMENTITIOUS MORTARS

(71) Applicant: LATICRETE INTERNATIONAL, INC., Bethany, CT (US)

(72) Inventors: Rajeswari Kompalli, Bethany, CT (US); Randall Bright, Naugatuck, CT (US); Eerik Maandi, Rocky Hill, CT (US)

(73) Assignee: LATICRETE INTERNATIONAL, INC., Bethany, CT (US)

( * ) Notice: Subject to any disclaimer, the term of this patent is extended or adjusted under 35 U.S.C. 154(b) by 104 days.

(21) Appl. No.: 17/009,134

(22) Filed: Sep. 1, 2020

(65) Prior Publication Data

US 2020/0399517 A1 Dec. 24, 2020

Related U.S. Application Data

(62) Division of application No. 16/242,978, filed on Jan. 8, 2019, now Pat. No. 10,870,785.

(60) Provisional application No. 62/614,788, filed on Jan. 8, 2018.

(51) Int. Cl.
| | | |
|---|---|---|
| C09K 5/14 | (2006.01) |
| C04B 22/02 | (2006.01) |
| C04B 24/26 | (2006.01) |
| C04B 24/38 | (2006.01) |
| C04B 14/06 | (2006.01) |
| C04B 14/28 | (2006.01) |
| C04B 26/02 | (2006.01) |
| C04B 28/04 | (2006.01) |
| C04B 14/38 | (2006.01) |
| C04B 103/32 | (2006.01) |
| C04B 111/00 | (2006.01) |
| C04B 111/62 | (2006.01) |
| C04B 111/70 | (2006.01) |

(52) U.S. Cl.
CPC ............... *C09K 5/14* (2013.01); *C04B 14/06* (2013.01); *C04B 14/28* (2013.01); *C04B 14/38* (2013.01); *C04B 22/02* (2013.01); *C04B 24/2623* (2013.01); *C04B 24/383* (2013.01); *C04B 26/02* (2013.01); *C04B 28/04* (2013.01); *C04B 2103/32* (2013.01); *C04B 2111/00465* (2013.01); *C04B 2111/00637* (2013.01); *C04B 2111/62* (2013.01); *C04B 2111/70* (2013.01); *C04B 2201/32* (2013.01)

(58) Field of Classification Search
CPC ..... C04B 14/06; C04B 14/024; C04B 14/026; C04B 14/26; C04B 14/28; C04B 14/38; C04B 22/02; C04B 24/38; C04B 24/2623; C04B 24/383; C04B 26/02; C04B 28/04; C04B 2103/0057; C04B 2103/32; C04B 2111/62; C04B 2111/70; C04B 2111/00465; C04B 2111/00637; C04B 2201/32; C09K 5/14
See application file for complete search history.

(56) References Cited

FOREIGN PATENT DOCUMENTS

| CN | 102757249 A | * | 10/2012 | |
|---|---|---|---|---|
| CN | 104402460 A | * | 3/2015 | |
| CN | 106396709 A | * | 2/2017 | ............. C04B 35/66 |
| CN | 106631052 A | * | 5/2017 | ............. C04B 35/66 |
| CN | 106747525 A | * | 5/2017 | |

* cited by examiner

*Primary Examiner* — Anthony J Green
(74) *Attorney, Agent, or Firm* — DeLio Peterson & Curcio LLC; Kelly M. Nowak (57) ABSTRACT

Thermally conductive cementitious compositions for use in flooring installations that are applied over a heat radiating flooring system to increase the thermal conductance of the flooring system and increase the rate of heating the flooring system. The thermally conductive cementitious compositions include a cementitious composition, amorphous flake graphite carbon, and an aqueous solution suitable for use as a thermally conductive mortar, grout or adhesive for flooring installations. The thermally conductive cementitious compositions also include a cementitious composition, mesh fine aluminum oxide, mesh coarse aluminum oxide, and an aqueous solution that provides a thermally conductive mortar, grout or adhesive for use in flooring installations.

17 Claims, 5 Drawing Sheets

FIG. 1

Heater/Temperature Sensor

Specimen

Heat Flow Transducer

Heat Sink

Guarded Heat Flow Test Method

FIG. 2

TABLE A

| Material | Thermal Conductivity (W/mK) |
|---|---|
| Silica Aerogel | 0.004-0.04 |
| Air | 0.025 |
| Wood | 0.04-0.4 |
| Mineral Oil | 0.138 |
| Rubber | 0.16 |
| Alcohols & oils | 0.1-0.21 |
| LPG | 0.23-0.26 |
| Portland cement | 0.29 |
| Epoxy (Silica Filled) | 0.3 |
| Unfilled Epoxy | 0.59 |
| Water | 0.6 |
| Thermal Grease | 0.7-3 |
| Glass | 1.1 |
| Concrete | 1.7 |
| Soil | 1.5 |
| Ice | 2 |
| Sand stone | 2.4 |
| Stainless Steel | 12.11 |
| Lead | 35.3 |
| Aluminum | 200 |
| Carbon as Graphite | 80-230 |
| Gold | 318 |
| Silver | 429 |
| Diamond | 900-2320 |

FIG. 3

TABLE B

| Material | (W/mK) | Material | (W/mK) |
|---|---|---|---|
| Acoustic plasterboard | 0.25 | Plasterboard | 0.21 |
| Aerated concrete slab (500kg/m3) | 0.16 | Plaster dense (1300 kg/m3) | 0.5 |
| Aluminum | 237 | Plaster lightweight (600 kg/m3) | 0.16 |
| Asphalt (1700kg/m3) | 0.5 | Plywood (950 kg/m3) | 0.16 |
| Bitumen-impregnated fiberboard | 0.05 | Prefabricated timber wall panels (check manufacturer) | 0.12 |
| Brickwork (outer leaf 1700kg/m3) | 0.84 | Screed (1200kg/m3) | 0.41 |
| Brickwork (inner leaf 1700kg/m3) | 0.62 | Stone chippings (1800 kg/m3) | 0.96 |
| Dense aggregate concrete block 1800 kg/m3 (exposed) | 1.21 | Tile hanging (1900 kg/m3) | 0.84 |
| Dense aggregate concrete block 1800 kg/m3 (protected) | 1.13 | Timber (650 kg/m3) | 0.14 |
| Calcium silicate board (600 kg/m3) | 0.17 | Timber flooring (650 kg/m3) | 0.14 |
| Concrete general | 1.28 | Timber rafters | 0.13 |
| Cast concrete (heavyweight 2300 kg/m3) | 1.63 | Timber roof or floor joists | 0.13 |
| Cast concrete (dense 2100 kg/m3 typical floor) | 1.4 | Roof tile (1900kg/m3) | 0.84 |
| Cast concrete (dense 2000 kg/m3 typical floor) | 1.13 | Timber blocks (650 kg/m3) | 0.14 |
| Cast concrete (medium 1400 kg/m3) | 0.51 | Web of I stud timber | 0.15 |
| Cast concrete (lightweight 1200 kg/m3) | 0.38 | Wood wool slab (500kg/m3) | 0.1 |
| Cast concrete (lightweight 600 kg/m3) | 0.19 | Cellular glass | 0.038-0.05 |
| Concrete slab (aerated 500kg/m3) | 0.16 | Expanded polystyrene | 0.030-0.038 |
| Copper | 390 | Expanded polystyrene slab (25 kg/m3) | 0.035 |
| External render sand/cement finish | 1 | Extruded polystyrene | 0.029-0.039 |
| External render (1300 kg/m3) | 0.5 | Glass mineral wool | 0.031-0.044 |
| Felt - Bitumen layers (1700kg/m3) | 0.5 | Mineral quilt (12 kg/m3) | 0.04 |
| Fiberboard (300 kg/m3) | 0.06 | Mineral wool slab (25 kg/m3) | 0.035 |
| Glass | 0.93 | Phenolic foam | 0.021-0.024 |
| Marble | 3 | Polyisocyanurate | 0.022-0.028 |
| Metal tray used in wriggly tin concrete floors (7800 kg/m3) | 50 | Polyurethane | 0.022-0.028 |
| Mortar (1750 kg/m3) | 0.8 | Rigid polyurethane | 0.022-0.028 |
| Oriented strand board | 0.13 | Rock mineral wool | 0.034-0.042 |
| Outer leaf brick | 0.77 | | |

ENERGY EFFICIENT CEMENTITIOUS MORTARS

PRIORITY

This application is a continuation of U.S. patent application Ser. No. 16/242,978 filed Jan. 8, 2019, now issued as U.S. Pat. No. 10,870,785 on Dec. 22, 2020, which claims benefit to U.S. Provisional Application Ser. No. 62/614,788 filed on Jan. 8, 2018.

BACKGROUND OF THE INVENTION

1. Field of the Invention

The present invention is directed to the construction industry, and in particular, to thermally conductive mortars, grouts and/or adhesives that improve heat transfer from floor warming mats to the surface of the tile, and the use thereof.

2. Description of Related Art

In flooring installation, an underlayment or floor mat is often used between an underlaying substrate, such as a floor, and the overlying surface tiling. In certain instances, the underlayment or floor mat may include or retain heated wiring that generates heat which is directed to the above tile to provide a heated floor. Both the underlayment and heated wiring are covered or encased within a cementitious, or cement-based, compositions formulated as mortars, grouts and/or adhesives.

A variety of known cementitious mortars and/or grouts are composed of a cement or cement-based component, water, and various additives or aggregates. The cement or cement-based components are often a dielectric material having a high density that prevents electric energy from passing through it as well as having low thermal conductance. This low thermal conductance makes it difficult to heat the overlying tile flooring, as well as being costly and taking extended times to heat the tiling. Cement or cement-based compositions for use in the construction industry, particularly for use as mortars, grouts and/or adhesives, having increased thermal conductance and thermal conductance properties would improve heat transfer from floor warming mats to the surface of the tile. The heat transfer would also be faster and provide a cost savings as compared to conventional lower thermal conductance mortars, grouts and/or adhesives.

Intending to eliminate these and other disadvantages of low thermal conductance cementitious building materials, there is a need for new and improved thermally conductive mortars, grouts and/or adhesives for which the present invention provides a solution thereto.

SUMMARY OF THE INVENTION

Bearing in mind the problem and deficiencies in the prior art, it is the primary object of the present invention to provide a novel, high thermally conductive cementitious compositions for use in flooring installations that are applied over a heat radiating flooring system to increase the thermal conductance of the flooring system and increase the rate of heating the flooring system.

The present invention is directed to a thermally conductive cementitious compositions for use in flooring installations that includes a cementitious composition, amorphous flake graphite carbon, and an aqueous solution. The thermally conductive cementitious composition comprises a thermally conductive mortar, grout or adhesive for use in flooring installations.

In one or more embodiments the cementitious composition may be a polymer modified cement tile adhesive present in an amount of about 35 wt. %, the amorphous flake graphite carbon may be present in an amount of about 6 wt. %, and the aqueous solution may be water present in an amount of about 25.5 wt. %. In one or more other embodiments the cementitious composition may be a sand aggregate present in an amount of about 50 wt. % to about 65 wt. %, the amorphous flake graphite carbon may be present in an amount of about 4 wt. %. to about 10 wt. %, and the aqueous solution may be water present in an amount of about 24.50 wt. %.

In certain embodiments the cementitious composition may further include Portland cement present in an amount of about 25 wt. % to about 30 wt. %, calcium magnesium carbonate present in an amount of about 4 wt. % to about 10 wt. %, vinyl acetate polymer present in an amount of about 1.5 wt. % to about 10 wt. %, methylcellulose present in an amount of about 0.2 wt. % to about 1 wt. %, calcium salt present in an amount of about 0 wt. % to about 0.5 wt. %, and super plasticizer present in an amount of about 0 wt. % to about 0.5 wt. %.

The thermally conductive cementitious composition has high thermal conductance and is applied over a heat radiating flooring system to increase the thermal conductance of the flooring system and increase the rate of heating the flooring system. The thermally conductive cementitious composition may be a thermally conductive mortar, such as, a self-leveling underlayment, an adhesive, a patch material, grout, or a cementitious mortar.

The invention is also directed to a thermally conductive cementitious composition for use in flooring installations that includes a cementitious composition, mesh fine aluminum oxide, mesh coarse aluminum oxide, and an aqueous solution. The thermally conductive cementitious composition comprises a thermally conductive mortar, grout or adhesive for use in flooring installations. The cementitious composition may be a sand aggregate present in an amount of about 0 wt. % to about 50 wt. %. The mesh fine aluminum oxide may be present in an amount of about 5 wt. %. to about 10 wt. %, and the mesh coarse aluminum oxide may be present in an amount of about 60 wt. %. to about 70 wt. %. The aqueous solution may be water present in an amount of about 15 wt. % to about 23 wt. %.

The thermally conductive cementitious composition may further include Portland cement present in an amount of about 15 wt. % to about 25 wt. %, calcium magnesium carbonate present in an amount of about 0 wt. % to about 10 wt. %, vinyl acetate polymer present in an amount of about 1.5 wt. % to about 3 wt. %, methylcellulose present in an amount of about 0.2 wt. % to about 1 wt. %, calcium salt present in an amount of about 0 wt. % to about 0.5 wt. %, and super plasticizer present in an amount of about 0 wt. % to about 0.5 wt. %.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings of the invention in which:

FIG. 4 illustrates thermal conductivities of various building materials suitable for use in combination with the formulations of the invention.

DESCRIPTION OF THE PREFERRED EMBODIMENT(S)

In describing the preferred embodiment of the present invention, reference will be made herein to FIGS. 1-6 of the drawings in which like numerals refer to like features of the invention. Features of the invention are not necessarily shown to scale.

The various embodiments of the invention are directed to thermally conductive formulations suitable for use as thermally conductive cementitious building materials. In one or more embodiments of the invention, the invention is directed to thermally conductive formulations suitable for use as mortars, grouts and/or adhesives that improve heat transfer from subfloors and/or floor warming mats to an overlying surface area, as well as the methods of making and use thereof. The floor warming mats may include, but are not limited to, an underlayment, a mat, a membrane, or substrate that holds, contains or is attached to heating elements, such as, heating wiring elements. The surface area that is heated may be overlying tiles or flooring.

While not meant to limit the invention, for ease of understanding the invention is described in connection with the present thermally conductive formulations being thermally conductive mortars, grouts and/or adhesives. For instance, the thermally conductive materials of the invention may be cementitious formulations provided as, but are not limited to, self-leveling underlayment materials, adhesive materials, patch materials, grouts, cementitious mortars, and the like.

In accordance with one or more embodiments of the invention, one or more thermally conductive mortar, grout and/or adhesive formulations of the invention may be used in the construction industry, and in particular, in connection with applying flooring. Radiant floor heating is gaining popularity in the construction industry. There are a number of different types of radiant floor heating systems and installations. They include, but are not limited to, radiant air floors (i.e., air is the heat carrier), electric radiant floors, and hot water radiant floors (i.e., (hydronic flooring systems). The various thermally conductive mortar, grout and/or adhesive formulations of the invention may be used in conjunction with any known or future radiant floor heating systems and installations.

The various thermally conductive mortar, grout and/or adhesive formulations of the invention increase the rate at which the surface area is warmed up or reaches a desired temperature. In doing so, the instant thermally conductive mortars formulations decrease the amount of power consumption required to heat such flooring, thereby decreasing heating costs (i.e., there is less power consumption resulting in cost savings to the customer).

In accordance with the various embodiments of the invention, thermally conductive mortar formulations are provided for use alone or in combination with an adhesive material. It has been found that the use of an adhesive along with the instant flooring thermally conductive mortar formulations transfer heat faster to the tile surface, as compared to use of known low thermal conductance adhesives alone.

Figure 1:
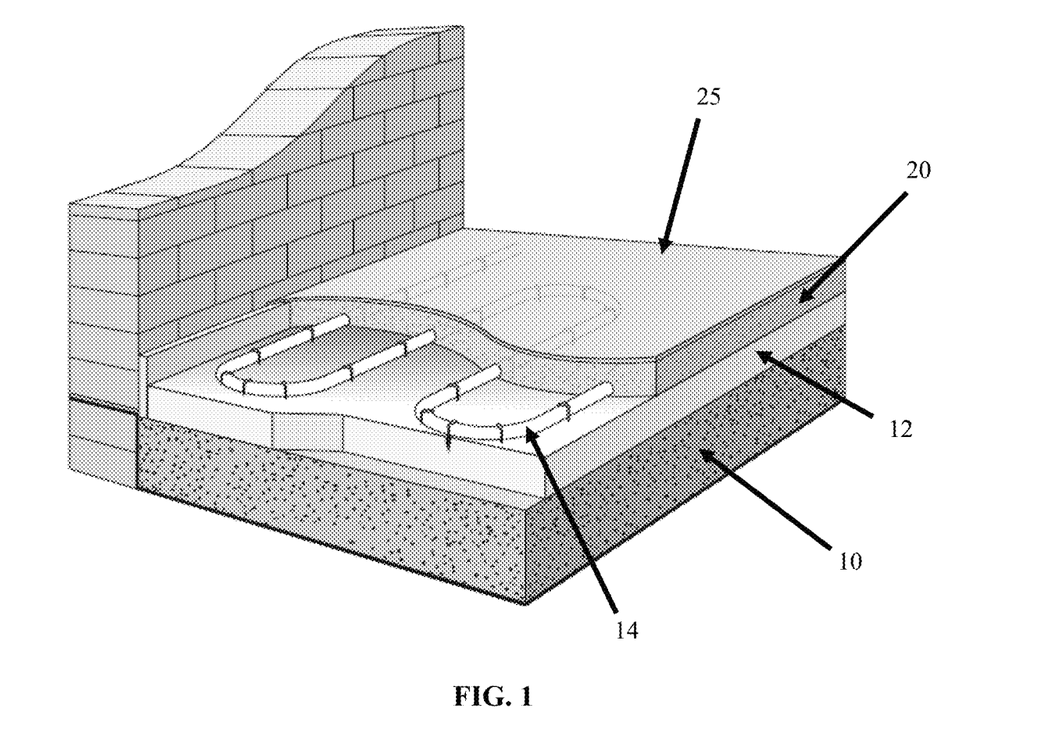
FIG. 1 illustrates an electric radiant floor heating assembly having the thermally conductive cementitious materials in accordance with embodiments of the invention.

Referring to FIG. 1, an electric radiant floor heating system and installation of the invention is shown. In this system, and the installation thereof, a substrate 10 (e.g., flooring) is prepared followed by placing or securing an electric floor warming mat over the substrate. The electric floor warming mat includes an underlayment 12 and heat wiring 14. The various thermally conductive cementitious materials 20 of the invention are applied over the electric floor warming mat to cover the underlayment 12, as well as cover and/or encase the heat radiating wiring 14. An overlying covering layer, such as tiles 25, is then applied directly over the thermally conductive cementitious materials 20, whereby the thermally conductive cementitious materials 20 of the invention increase energy efficient, heat transfer rates, and heat transfer energy from the electric floor warming mat to the surface of the overlying covering layer (i.e., surface of the tile). One or more embodiments of the invention also provide heated flooring applications or installations implementing the instant thermally conductive formulations of the invention.

The present thermally conductive formulations of the invention are suitable for use with a variety of different building materials, each of which has its own thermal conductivity. It should be appreciated that thermal conductivity is a property of a material to conduct heat. Materials with low thermal conductivity transfer heat slower, while materials with high thermal conductivity transfer heat faster than low conductance materials. The various thermally conductive mortar, grout and/or adhesive formulations of the invention may be used in conjunction with several different materials, each having different thermal conductivity values. These materials may be incorporated into formulations of the invention, or they may be used in combination with the present formulations.

Figure 3:
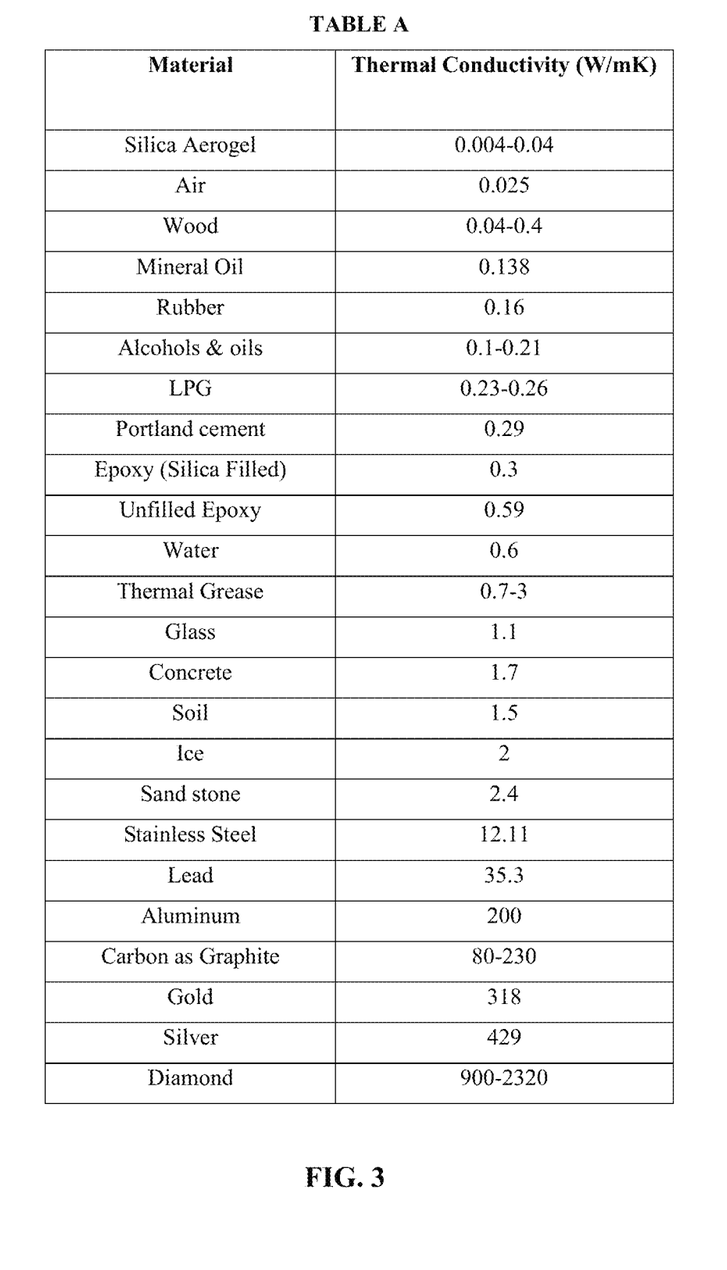
FIG. 3 illustrates thermal conductivities of various materials suitable for use in combination with the formulations of the invention.

For instance, Table A, depicted in FIG. 3, describes various materials suitable for use in combination with the present thermally conductive formulations of the invention along with their corresponding thermal conductivity measured in Watts per Metre Kelvin (W/mK). Referring to Table B, depicted in FIG. 4, in the building industry, and in particular flooring installation, materials used during such flooring installation, including both structural and finishing materials, also have various thermal conductivities. The various thermally conductive mortar, grout and/or adhesive formulations of the invention may be applied under, over or both under/over one or more of these building materials, whereby the thermal conductance of the present formulations may be modified or provided to be suitable with these building materials for increasing thermal conductance to surface areas. For instance, materials and/or amounts of compositions with the present thermally conductive formulations of the invention may be adjusted or altered to meet desired specifications or to increase thermal conductance of such formulations when combined with the materials (and their corresponding thermal conductivity) listed in Tables A and B.

In accordance with one or more embodiments, exemplary thermally conductive mortar formulations of the invention are described below.

Figure 2:
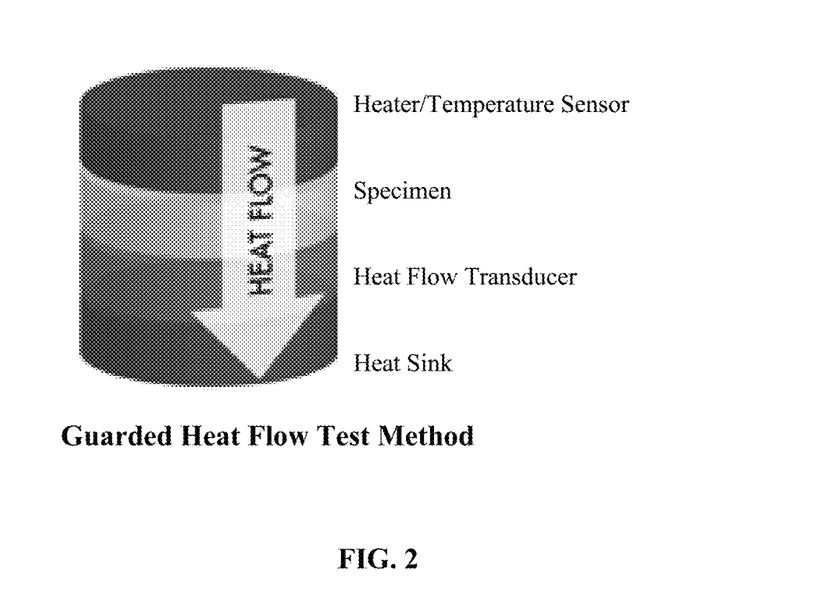
FIG. 2 illustrates test performance data of the present invention
Figure 5:
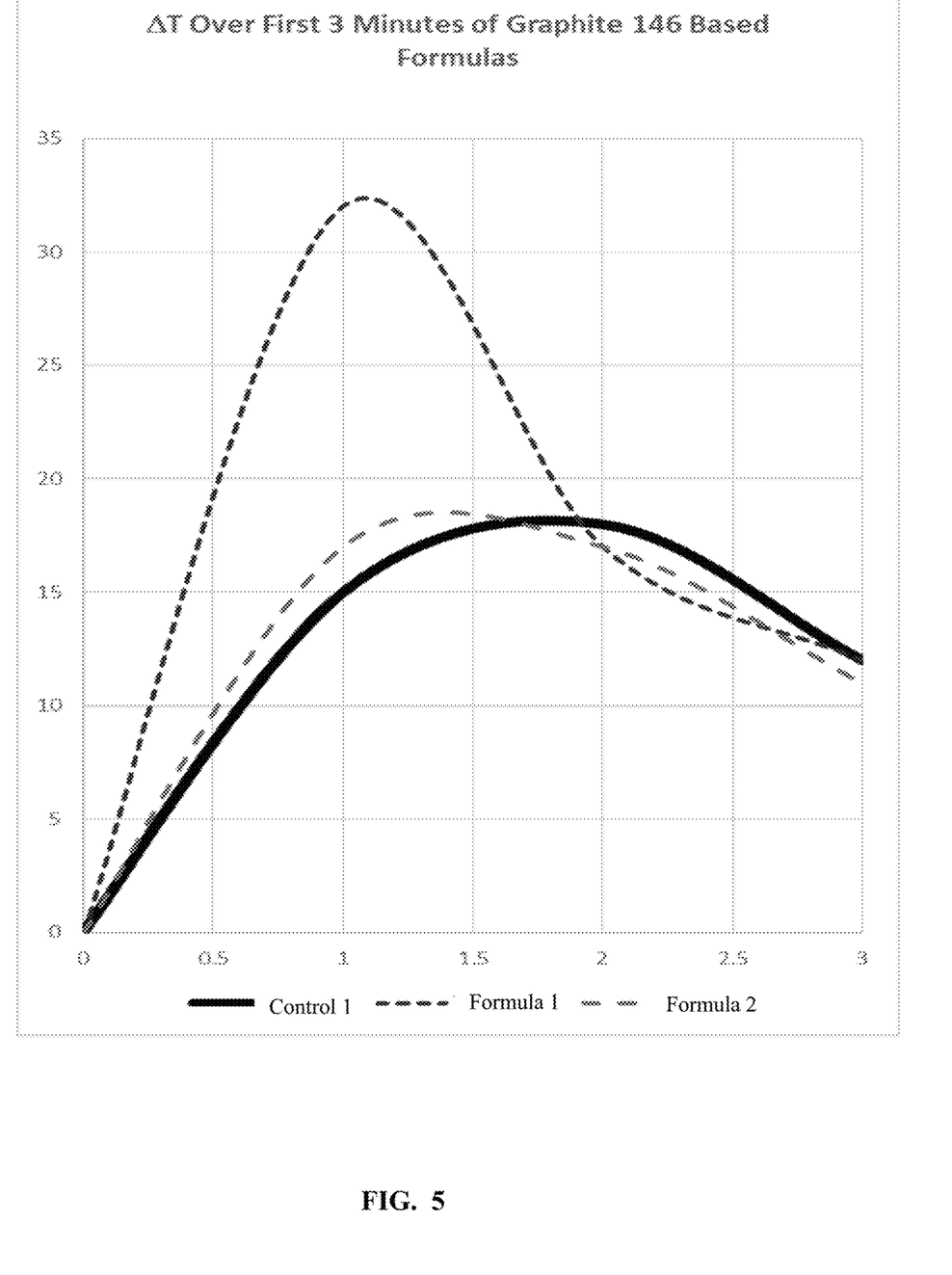
FIG. 5 depicts graphed results of change in temperature for one or more formulations of the invention.
Figure 6:
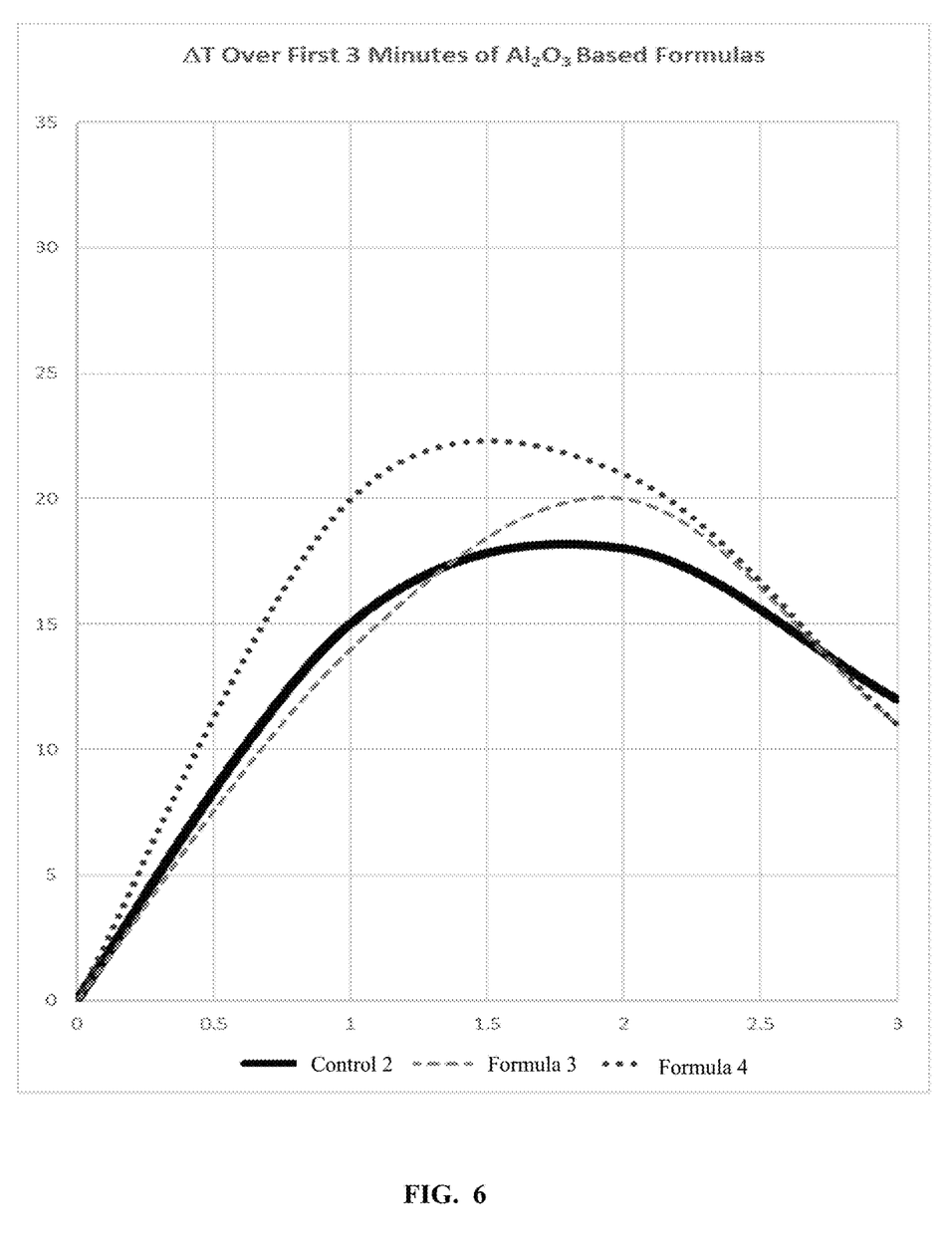
FIG. 6 depicts graphed results of change in temperature for other formulations of the invention.

In these exemplary formulations, test methods analyzed the various thermally conductive mortar formulations for thermal conductivity and/or temperature rise. Referring to FIG. 2, the test method implemented is referred to as "Guarded Heat Flow Test Method" utilizing a TA DTC-300 Thermal Conductivity Meter. The data for the exemplary formulations was collected by heating a cured 4×4 inch sample on a hot plate set to 80° C. As the sample was heated, the rise in temperature was measured using a thermocouple each minute. The formulas were also validated by measuring the thermal conductivity of the formulas that were cured in ½-inch thick discs. The testing was done in accordance with the ASTME1530. The data was monitored over the course of a 28-day curing period. The following description and Tables detail one or more preferred thermally conductive formulations of the invention. Results of these formulations are also depicted in the Graphs of FIGS. 5 and 6.

Referring to one or more embodiments, different thermally conductive graphite-based formulations (e.g., graphite 146 carbon flake) of the invention are described below in Table 1 as Formula 1 and Formula 2. These formulations of the invention were tested against control formulation (i.e., Control 1-100 wt % Polymer Modified Cement Tile Adhesive) as described in Table 1.

TABLE 1

Graphite 146 Carbon Flake Based Formulas

| Raw Material/Ingredients | Control 1 wt. % | Formula 1 wt. % | Formula 2 wt. % |
|---|---|---|---|
| Polymer Modified Cement Tile Adhesive | 100 | 94 | |
| Sand Aggregate (0.075 mm-3 mm) (i.e., fine sand) | | | 50-65% (e.g. 58.20) |
| Flake Graphite 146 (i.e., amorphous flaky graphite (carbon)) | | 6 | 4-10% (e.g. 6.20) |
| Grey Cement (i.e., Portland cement) | | | 25-30% (e.g. 26.52) |
| Dolomitic Limestone (Calcium Magnesium Carbonate) | | | 4-10% (e.g. 5.85) |
| Vinyl Acetate Based redispersible powder polymer | | | 1.5-10% (e.g. 2.60) |
| Methylcellulose (MC) or hydroxypropyl methylcellulose (HPMC) | | | 0.2-1% (e.g. 0.31) |
| Calcium Salt of Formic Acid | | | 0-0.5% (e.g. 0.17) |
| Melamine and Polycarboxylate (PCE) based Super plasticizer | | | 0-0.5% (e.g. 0.15) |
| Water Content, based on 100 wt. % of the dry powder mix | 23.00 | 25.5 | 24.50 |

As shown in Table 1, in accordance with one or more embodiments of the invention preferred ranges of the various components within each of Formula 1 and Formula 2 are described, along with more preferred amounts of each component within each of Formula 1 and Formula 2. The more preferred amounts shown in Table 1 of Formula 1: 94, 9, 25.5; and Formula 2: 58.20, 6.20, 26.52, 5.85, 2.60, 0.31, 0.17, 0.15 and 24.50, were tested as described herein and shown in Tables 2 and 3 below, and in the graph of FIG. 5.

TABLE 2

| | Thermal Conductivity, K (w/m-k) | | |
|---|---|---|---|
| Formulas/Samples | Day 10 | Day 30 | % change |
| Control (Polymer Modified thinset out of a bag) - "Control 1" | 0.68 | 0.68 | 0.00% |
| 68.5% Aluminum oxide | 0.50 | 0.52 | 4.00% |
| Control with 3% Iron Oxide | 0.52 | 0.53 | 1.92% |
| Control plus 3% iron oxide plus 3% flake Graphite | 0.60 | 0.62 | 3.33% |
| Inventive Formula 1 (94% Control plus 6% Flake graphite) - "Formula 1" | 0.72 | 0.75 | 4.17% |
| Inventive Formula 2: Thermally Conductive Adhesive Experimental formula - "Formula 2" | 0.70 | 0.74 | 5.71% |

Table 2 above details the measured conductivity temperatures for Control 1 as compared to the thermally conductive Formula 1 and Formula 2 of the invention. Other control formulations are also tested and compared against the thermally conductive formulations of the invention. As is shown, the thermally conductive formulations of the invention provide a higher conductivity over long durations. As such, the present thermally conductive formulations improve heat transfer from floor warming mats to the surface of the tile as compared to the control formulations/samples. The measured temperatures for Control 1 and thermally conductive formulations Formula 1 and Formula 2 of the invention are depicted below in Table 3. The results of Table 3 are compared to each other in the Graph of FIG. 5 showing the change in temperature from minute to minute for Control 1, Formula 1, and Formula 2.

TABLE 3

| | Control 1 1D cure 1D HA @ 80 C. | Formula 1 Instron Room Cured Average | Formula 2 Instron Room Cured Average |
|---|---|---|---|
| T (min) | T (° F.) | T (° F.) | T (° F.) |
| 0 | 73 (DT = 0) | 72 (DT = 0) | 72 (DT = 0) |
| 1 | 88 (DT = 15) | 104 (DT = 32) | 89 (DT = 17) |
| 2 | 106 (DT = 18) | 121 (DT = 17) | 106 (DT = 17) |
| 3 | 118 (DT = 12) | 133 (DT = 12) | 117 (DT = 11) |
| 4 | 125 (DT = 7) | 140 (DT = 7) | 125 (DT = 8) |
| 5 | 133 (DT = 8) | 144 (DT = 4) | 132 (DT = 7) |
| 6 | 140 (DT = 7) | 150 (DT = 6) | 136 (DT = 4) |
| 7 | 144 (DT = 4) | 154 (DT = 4) | 140 (DT = 4) |
| 8 | 147 (DT = 3) | 158 (DT = 4) | 143 (DT = 3) |
| 9 | 149 (DT = 2) | 160 (DT = 2) | 146 (DT = 3) |
| 10 | 153 (DT = 4) | 163 (DT = 3) | 148 (DT = 2) |

While the invention is described in connection with graphite grade 146 ("graphite 146"), it should be appreciated that various other grades of graphite or carbon-based materials (e.g., carbon containing compositions, carbon materials, carbon blends, etc.) are envisioned within the scope of the present invention. Flake graphite is a naturally occurring form of graphite that is typically found as discrete flakes ranging in size from 50-800 micrometers in diameter and 1-150 micrometers thick. This form of graphite has a high degree of crystallinity, which equates to near theoretical true density, high thermal and electric conductivity, and low spring-back (i.e., excellent molding characteristics). Flake graphite is available in purities ranging from 80-99.9% carbon, and sizes from 2-800 microns.

In accordance with one or more other embodiments, the thermally conductive formulations of the invention may include aluminum oxide based thermally conductive formulations. The aluminum oxide based thermally conductive formulations were prepared as described below in Table 4 as Formula 3 and Formula 4. Table 4 includes preferred ranges and more preferred ranges of the various compositions within formulations Formula 3 and Formula 4. The more preferred ranges are exemplary tested percentage amounts for each Formula 3 and Formula 4. These formulations of the invention were tested against control formulation Control 2 also described in Table 4.

The various thermally conductive formulations and flooring systems made with the instant higher thermally conductive materials heat up the tile floor faster, as well as hold the heat longer. The invention provides an improved energy efficient flooring system that reduces electricity costs.

While the present invention has been particularly described, in conjunction with a specific preferred embodiment, it is evident that many alternatives, modifications and variations will be apparent to those skilled in the art in light

TABLE 4

| Aluminum Oxide Based Formulas | | | |
|---|---|---|---|
| | Control 2 | Formula 3 (W/mK) | Formula 4 |
| Raw Material/Ingredients | 0.68 wt. % | wt. % | 0.52 wt. % |
| Polymer Modified Cement Tile Adhesive | 100 | | |
| Sand Aggregate (0.075 mm-3 mm) | | 0-50% | 0-50% |
| Flake Graphite 146 (i.e., amorphous flaky graphite (carbon)) | | | |
| Grey Cement (i.e., Portland cement) | | 15-25 | 15-25 (e.g., 20.89) |
| Dolomitic Limestone (Calcium Magnesium Carbonate) | | 0-10 | 0-10 |
| Vinyl Acetate Based redispersible powder polymer | | 1.5-3 | 1.5-3 (e.g., 2.04) |
| Methylcellulose (MC) or hydroxypropyl methylcellulose (HPMC) | | 0.2-1 | 0.2-1 (e.g., 0.24) |
| Calcium Salt of Formic Acid | | 0-0.5 | 0.-0.5 (e.g., 0.13) |
| Melamine and Polycarboxylate (PCE) based Super plasticizer | | 0-0.5 | 0-0.5 |
| 320 Mesh Fine Alumina, Aluminum Oxide | | 5.0-10.0 | 5.0-10.0 (e.g., 8.24) |
| 70 Mesh Coarse Alumina, Aluminum Oxide | | 60-70 | 60-70 (e.g., 68.45) |
| Water Content, based on 100% of the dry powder mix | 23.00 | 23.00 | 17.00 (e.g., 17.0) |

Table 4 above details the measured conductivity temperatures for Control 2 as compared to the thermally conductive Formula 3 and Formula 4 of the invention. As is shown, the thermally conductive formulations of the invention provide a high conductivity over long durations. The results of Table 4 are depicted in the Graph of FIG. 6, which shows the change in temperature from minute to minute for Control 2, Formula 3, and Formula 4. It has been found that the present thermally conductive formulations improve heat transfer from floor warming mats to the surface of the tile as compared to the control formulations/samples.

TABLE 5

| T (min) | Control 2 1D cure 1D HA @80 C. T (° F.) | Formula 3 Instron Room Cured Average T (° F.) | Formula 4 Instron Room Cured Average T (° F.) |
|---|---|---|---|
| 0 | 73 (DT = 0) | 75 (DT = 0) | 73 (DT = 0) |
| 1 | 88 (DT = 15) | 89 (DT = 14) | 93 (DT = 20) |
| 2 | 106 (DT = 18) | 109 (DT = 20) | 114 (DT = 21) |
| 3 | 118 (DT = 12) | 120 (DT = 11) | 125 (DT = 11) |
| 4 | 125 (DT = 7) | 127 (DT = 7) | 133 (DT = 8) |
| 5 | 133 (DT = 8) | 136 (DT = 9) | 139 (DT = 6) |
| 6 | 140 (DT = 7) | 142 (DT = 6) | 142 (DT = 3) |
| 7 | 144 (DT = 4) | 146 (DT = 4) | 148 (DT = 6) |
| 8 | 147 (DT = 3) | 148 (DT = 2) | 151 (DT = 3) |
| 9 | 149 (DT = 2) | 152 (DT = 4) | 152 (DT = 1) |
| 10 | 153 (DT = 4) | 157 (DT = 5) | 156 (DT = 4) | of the foregoing description. It is therefore contemplated that the appended claims will embrace any such alternatives, modifications and variations as falling within the true scope and spirit of the present invention.

Thus, having described the invention, what is claimed is:

1. A thermally conductive cementitious composition for use in flooring installations comprising:
    a cementitious composition including a sand aggregate present in an amount greater than 0 wt. % to about 50 wt. %;
    mesh fine aluminum oxide present in an amount of about 5 wt. % to about 10 wt. %;
    mesh coarse aluminum oxide present in an amount of about 60 wt. % to about 70 wt. %;
    Portland cement present in an amount of about 15 wt. % to about 25 wt. %; and
    an aqueous solution comprising water present in an amount of about 15 wt. % to about 23 wt. %,
    wherein the thermally conductive cementitious composition comprises a thermally conductive mortar, grout or adhesive for use in flooring installations.

2. The composition of claim 1 further including:
    calcium magnesium carbonate present in an amount of about 0 wt. % to about 10 wt. %;
    vinyl acetate polymer present in an amount of about 1.5 wt. % to about 3 wt. %;
    methylcellulose present in an amount of about 0.2 wt. % to about 1 wt. %;

calcium salt present in an amount of about 0 wt. % to about 0.5 wt. %; and super plasticizer present in an amount of about 0 wt. % to about 0.5 wt. %.

3. The composition of claim 2 wherein:

the sand aggregate present in an amount of about 0 wt. % to about 50 wt. % the aqueous solution is water present in an amount of about 17 wt. %;

the Portland cement is present in an amount of about 20.89 wt. %;

the calcium magnesium carbonate present in an amount of about 0 wt. % to about 10 wt. %;

the vinyl acetate polymer is present in an amount of about 2.04 wt. %;

the methylcellulose is present in an amount of about 0.24 wt. %;

the mesh fine aluminum oxide is present in an amount of about 8.24 wt. %;

the mesh coarse aluminum oxide is present in an amount of about 68.45 wt. %;

the calcium salt is present in an amount of about 0.13 wt. %; and the super plasticizer present in an amount of about 0 wt. % to about 0.5 wt. %.

4. The composition of claim 1 wherein the thermally conductive cementitious composition has high thermal conductance and is applied over a heat radiating flooring system to increase the thermal conductance of the flooring system and increase a rate of heating the flooring system.

5. The composition of claim 4 wherein the thermally conductive cementitious composition is a thermally conductive mortar.

6. A thermally conductive cementitious composition for use in flooring installations comprising:

a dry component comprising a mesh fine aluminum oxide present in an amount of 5-10 wt. %, a mesh coarse aluminum oxide present in an amount of 50-70 wt. %, and grey cement present in an amount of 15-25 wt. %, wherein said wt. % are based on a total weight of the dry component; and water mixed with the dry component to render the thermally conductive cementitious composition that increases heat transfer from a radiant floor heating system, over which the thermally conductive cementitious composition is deposited, to a substrate overlying the thermally conductive cementitious composition.

7. The composition of claim 6 wherein the mesh fine aluminum oxide comprises a 320 mesh aluminum oxide.

8. The composition of claim 6 wherein the mesh coarse aluminum oxide comprises a 70 mesh aluminum oxide.

9. The composition of claim 6 further including vinyl acetate polymer present in an amount of about 1.5-3 wt. %, based on the total weight of the dry component.

10. The composition of claim 6 further including one or more of the constituents selected from the group consisting of sand aggregate, calcium magnesium carbonate, methylcellulose, hydroxypropyl methylcellulose, calcium salt, and a superplasticizer.

11. The composition of claim 6 further including sand aggregates having a diameter ranging from 0.075 mm-3 mm present in an amount of about 0-50 wt. %, based on the total weight of the dry component.

12. The composition of claim 6 further including calcium magnesium carbonate in an amount of about 0-10 wt. %, based on the total weight of the dry component.

13. The composition of claim 6 further including melamine and polycarboxylate (PCE) based superplasticizer in an amount of about 0-0.5 wt. %, based on the total weight of the dry component.

14. The composition of claim 6 further including calcium salt of formic acid in an amount of about 0-0.5 wt. %, based on the total weight of the dry component.

15. The composition of claim 6 wherein the thermally conductive cementitious composition is a thermally conductive mortar.

16. The composition of claim 15 wherein the thermally conductive mortar is a self-leveling underlayment, an adhesive, a patch material, grout, or a cementitious mortar.

17. The composition of claim 15 wherein the heat radiating flooring system comprises an electric floor warming mat, the thermally conductive cementitious composition is deposited directly over the electric floor warming mat to increase the thermal conductance and increase a rate of heating the overlying substrate.

* * * * *